United States Patent [19]

Rise

[11] Patent Number: 4,742,837
[45] Date of Patent: May 10, 1988

[54] MULTI PURPOSE HIKING POLE

[76] Inventor: Leif Rise, 7748 Westlawn Ave., Los Angeles, Calif. 90045

[21] Appl. No.: 921,442

[22] Filed: Oct. 22, 1986

[51] Int. Cl.⁴ ............................................. A45B 3/00
[52] U.S. Cl. ..................................................... 135/66
[58] Field of Search .............. 280/814, 815, 819, 813, 280/820, 821, 822, 823, 826; 135/114, 65; 273/75, 81 D

[56] References Cited

U.S. PATENT DOCUMENTS

| | | | |
|---|---|---|---|
| 281,245 | 7/1883 | Degenhart . | |
| 303,408 | 8/1884 | Wheeler | 74/162 |
| 560,391 | 5/1896 | Checkley | 24/129 R |
| 581,853 | 5/1897 | Bakins | 24/136 R |
| 648,123 | 4/1900 | Goerz . | |
| 673,482 | 5/1901 | Shipway | 135/47 |
| 686,888 | 11/1901 | Crowe | 24/136 R |
| 1,327,591 | 1/1920 | Charles | 24/129 R |
| 1,734,170 | 12/1926 | Leffert | 135/114 |
| 1,961,099 | 5/1934 | Dickson | 135/65 |
| 2,031,384 | 2/1936 | Oliver | 135/65 |
| 2,186,535 | 1/1940 | MacGeorge | 135/90 |
| 2,347,789 | 5/1944 | Nichols | 280/821 |
| 3,297,333 | 1/1967 | Schwedt et al. | 280/820 |
| 3,443,820 | 5/1969 | Baker | 135/65 |
| 3,760,827 | 9/1973 | Weber | 135/46 |
| 3,810,647 | 5/1974 | Martchenke | 280/816 |
| 3,866,619 | 2/1975 | Frisk | 135/15 |
| 3,991,780 | 11/1976 | Maroski, Jr. | 135/66 |
| 4,314,575 | 2/1982 | Tui Kuo | 135/66 |
| 4,481,964 | 11/1984 | Minneman | 135/66 |

Primary Examiner—Robert A. Hafer
Assistant Examiner—Charles H. Sam
Attorney, Agent, or Firm—William H. Maxwell

[57] ABSTRACT

A multi purpose mountaineering pole for hiking and related activities, characterized by an adjustable security strap and anchor collar that lock onto a depressible hand grip, and by a head and removable cap that adjustably secures lines and mounts other accesories or implements, the security strap and anchor collar being instantaneously positionable for ascent or descent and other hiking conditions.

19 Claims, 3 Drawing Sheets

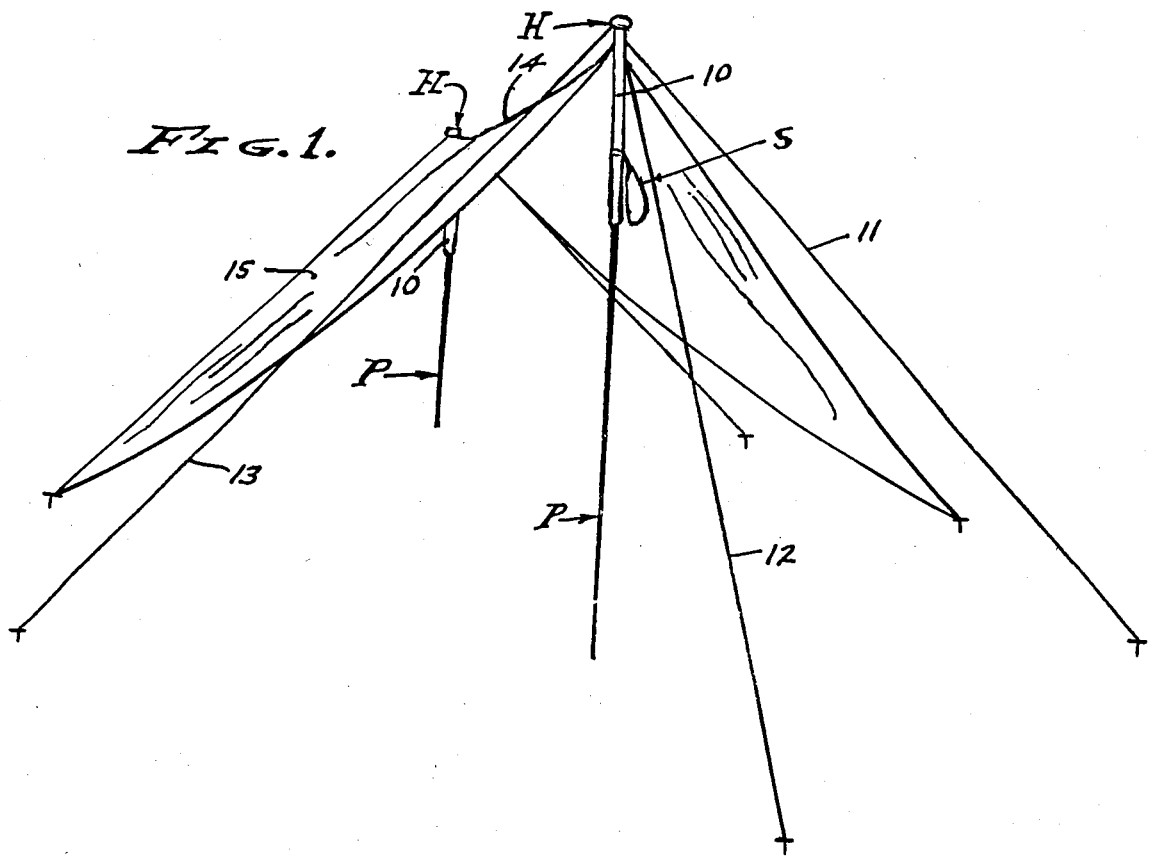

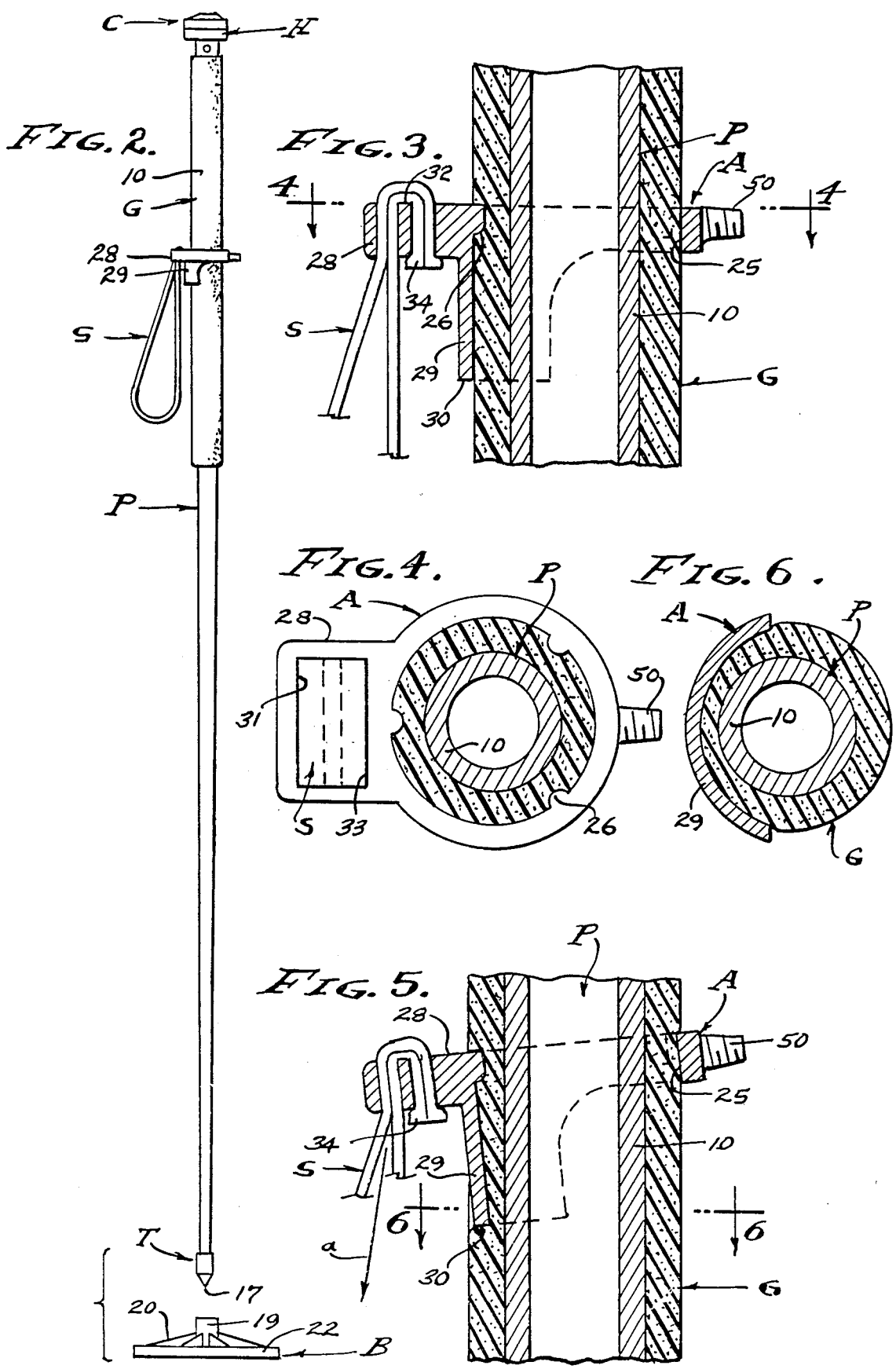

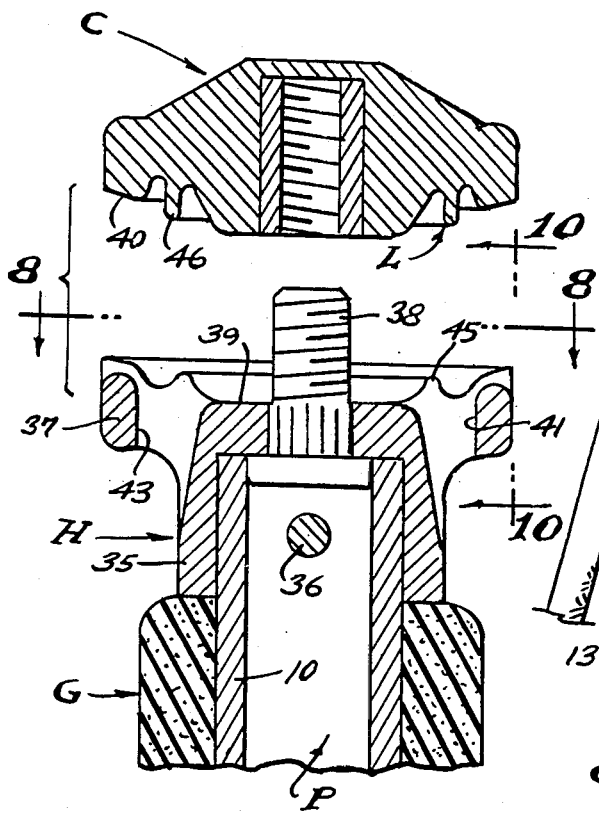
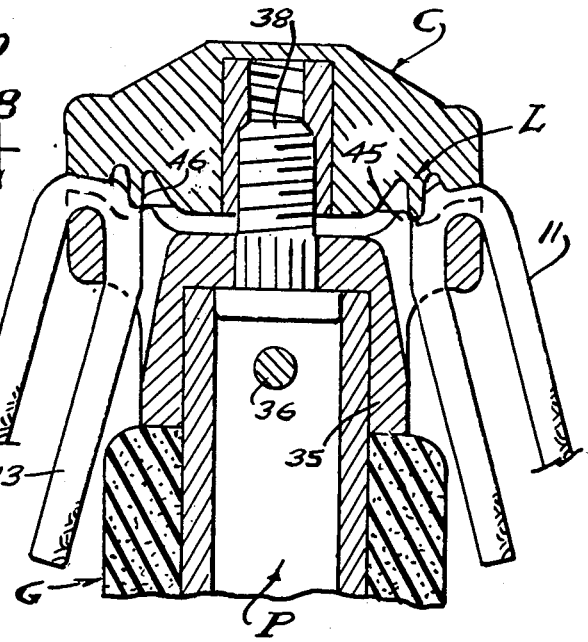
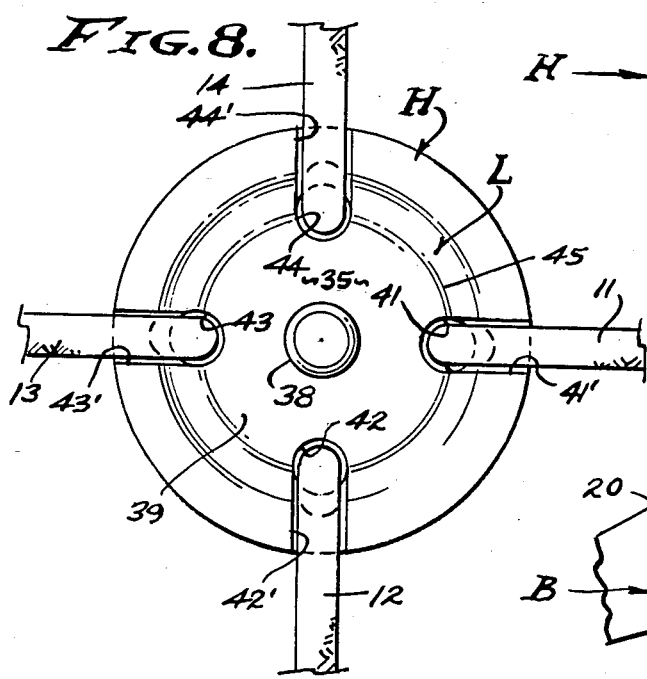

4,742,837

MULTI PURPOSE HIKING POLE

BACKGROUND OF THE INVENTION

This invention relates to hiking and the out-of-doors, and especially to mountaineering and the like. The vocation or sport of hiking involves the traverse of difficult terrain, such as the ascent or descent of steep slopes involving rocks or boulders and shelves or cliffs which must be crossed. It is of course natural to aid ones self with an arm and hand, or even to crawl on all fours. But, the normal erect posture of man is to be desired, for many reasons among which is the ability to carry a back pack in the normally required manner. Therefore, it is common practice to use a hiking stick or pole, and preferably a pair of such poles and one in each hand. Poles of this type are light weight and their length adapted to the hiker using the same, and such poles have been multi-purpose supports for various other gear associated with hiking and the out-of-doors. For example, for the attachment of cameras, pick heads, shelter poles or props, gun rests, and for ski pole attachments etc. However, piror art hiking poles of the type under consideration have been wanting in hiker convenience and versatility. Therefore, it is an object of this invention to provide an improved Multi Purpose Hiking Pole that is adaptable to associated support functions without sacrificing its ultimate utility as a hiking pole per se.

Heretofore, hiking poles have been standardized to generally accepted operational lengths, with wrist straps affixed to the head portion of the pole. Accordingly, the hiker must adapt to insertion of his wrist or forearm through the strap in order to accomodate for his stature. Further, such an adjustment is usually required to compensate for upgrade or downgrade hiking; to lower his grip on the pole during ascent, or to raise his grip on the pole during descent. Heretofore, this raising and lowering of the grip in order to adjust to terrain requirements has been difficult and time consuming, in that it is often necessary to disengage ones wrist from the strap which is normally in a fixed position at the top of the pole. Furthermore, the hand grips of prior art poles are generally too short to afford adequate raising and lowering of the hiker's grip. Accordingly, it is an object of this invention to provide an intantaneously adjustable strap, and to substantially lengthen the grip in cooperation therewith, so as to facilitate raising and lowering of the hiker's grip at will while traversing those difficult obstacles that are usually encountered. That is, generally, to lower the strap for ascending conditions and to raise the strap for descending conditions; and all without modifying the pole which is inherenly adapted to these various conditions.

Among the multipurpose uses of this hiking pole is the strap of loop configuration tht is adjustable along the handle of the pole, to accomodate the hiker's hand or wrist or forearm and upper arm if and when necessary, and to accomodate or support equipment such as a camera or telescope or gun barrel etc.

The head of this hiking pole is most useful and utilitarian, in that it is a coupling means for the adjustable securement of lines and tethers, as for example those lines and tethers necessary in order to erect a tent or shelter. With the present invention there is a cap that adjustably couples to the head of the pole and frictionally engages the lines or tethers according to the tightness which circumstances require. The top of the pole is threaded for the attachment of a camera or pick head or the like, and for this purpose the cap is removed and replaced or stored on a fitting projecting from the pole, preferably from the fitting attachment for adjustable securement of the strap.

SUMMARY OF THE INVENTION

The hiking pole of the present invention is an ultra light weight multipurpose pole adapted to the conditions of hiking. Primarily, this pole is instantly adapted to both ascent and descent conditions, and as well to the many special conditions that arise. For the average or normal person, this pole is approximately five feet in length, and the body thereof is of light weight material with a sharp lower end and a lengthy upper hand grip. The top terminal end of the pole is characterized by a multipurpose head normally covered by a cap which cooperates with the head to adjustably secure lines or tethers, the cap being removeable for the securement of other equipment or devices as may be required in hiking activities. A feature of this invention is the security strap and its anchor collar that are inherently adjustable along the hand grip so as to attain any fixed position thereof that may be required. Use of this security strap and anchor collar combination is versatile, in that the strap can be gripped by hand together with the pole above or below the anchor collar, or the strap can encompass the wrist or forearm (in extreme cases the upper arm) and the pole gripped above or below the anchor collar; all as required on an instantaneous basis as hiking conditions vary. It is to be understood that the anchor collar has a wide range of adjustment coextensive with the length of the hand grip, and that the anchor colar and security strap are free to rotate into any comfortable position with respect to the pole and hand grip, which is an ever changing requirement when hiking over difficult ground.

The foregoing and various other objects and features of this invention will be apparent and fully understood from the following detailed description of the typical preferred forms and applications thereof, throughout which description reference is made to the accompanying drawings.

THE DRAWINGS

FIG. 1 illustrates the use of two hiking poles of the present invention, for the erection of a tent or shelter, and adapted to lines or tethers for that purpose.

FIG. 2 is a side elevational view of the pole of the present invention, being an exploded view including a basket attachement for skiing.

FIG. 3 is an enlarged fragmentary view taken as a section through the handle portion of the pole shown in FIG. 2, showing securement of the security strap by the anchor collar that characterizes this invention.

FIG. 4 is a sectional view taken as indicated by line 4—4 on FIG. 3, showing the unstressed condition of the anchor collar.

FIG. 5 is a view similar to FIG. 3, showing the result of stress applied to the anchor collar by pressure applied through the security strap.

FIG. 6 is a sectional view taken as indicated by line 6—6 on FIG. 5, showing the stressed condition of the anchor collar.

FIG. 7 is an enlarged fragmentary view taken as a section through the top end portion of the pole shown in FIG. 2, showing securement means for the lines or tethers, being an exploded view to show separation of the members involved.

FIG. 8 is a plan view of the head end of the pole and taken as indicated by line 8—8 on FIG. 7.

FIG. 9 is a view similar to FIG. 7, showing the assembled condition of the securement means with the line or tethers adjusted thereby.

FIG. 10 is a side elevation showing the line or tether reception features of the head of the pole.

And, FIG. 11 is an enlarged fragmentary view taken through the ski basket attachment applied to the bottom end or tip of the pole.

PREFERRED EMBODIMENT

Referring to FIGS. 1 of the drawings, typical uses of this Multi Purpose Hiking Pole P are shown. It is most significant that the security strap S is instantaneously adjustable coextensively of the length of the handle portion 10 of the pole, whereby a hand grip at any position throughout the length of the handle portion can be attained. For example, the security strap S is below the hiker's hand while gripping is at the top of the handle portion 10; or the security strap S is above the hiker's hand while gripping at an intermediate part of the handle portion 10. It will become apparent as hereinafter described how an anchor collar A provides for instantaneous adjusted positioning of the security strap S at any position within the top and bottom limits of the handle portion 10. In FIG. 1 a pair of hiking poles P are used as tent supports, wherein the heads H thereof are employed to secure a multiplicity of lines or tethers 11-14, and over which a cover 15 is drawn and carried generally as shown. The security strap S of the pole P is adjustable to the stature of the hiker and to those conditions which prevail, and especially ascent conditions as distinguished from descent conditions, and all of which is accomplished at will as circumstances require.

The pole P is an elongated body 16 of ultra light weight tube of tapered configuration with a ground engageable tip T at its lower end and a utility head H at its top end. The upper end portion of the pole is cylindrical and of uniform cross section so as to establish the handle portion 10, the top and bottom ends being closed and sealed for floatation. In practice, the pole tube is fabricated of aluminum or magnesium or the like, or it may be a carbon fiber composite or like tube form. When using a light weight metal fabrication the pole tube is tapered by using a swaging operation or the like, and the metal strengthened thereby and/or by heat treating. As shown, the pole P is five feet in length, with the handle portion 10 0.625 inch diameter and the tip 0.400 inch diameter.

The tip T is a cup-shaped member press fitted over the bottom end portion of the pole body 16, to close the same, and has a point 17. In practice, the tip T is of hard material such as a hardened steel, and which also presents an upwardly faced shoulder 18 for the retainment of a mounting sleeve 19 that secures a ski basket 8 thereto as shown in FIGS. 1 and 11. The sleeve 19 is provided with a restricted opening 1t 23 to engage over the tapered point of the tip, and from which radial legs 20 extend to carry the basket ring 22. The baskets B are pressed onto and removed from the pole tip at will, converting the pole use as required.

The handle portion 10 of pole P is covered by a depressible grip G, and in accordance with this invention the grip G is a cylindrical sleeve made of rubber or like material that is both elastic and depressible. The purpose of said depressibility and elasticity is evident from FIGS. 3 and 4 as compared with FIGS. 5 and 6, whereby the anchor collar A is instantaneously adjustable to as to be in a locked condition when supporting the weight of the hiker. In practice, the handle portion 10 and grip G are coextensively 19 to 20 inches long, and the outside diameter of the grip G is approximately 1.1 inches. The Shore hardness of the grip rubber (its softness) is 55 to 70 on the A Scale, and it may a solid or a foamed material as desired. In practice, the grip is a foamed rubber having a nominal ¼ inch wall of uniform cross section secured onto the handle portion 10 to be permanently affixed.

In accordance with this invention, I provide the instantaneously adjustable security strap S and anchor collar means A. The strap and anchor collar combination is movable coextensively along the grip G and is frictionally engaged over the grip for placement as may be required. Accordingly, the anchor collar A is characterized by a ring-shaped body with an inner diameter 25 that slides over the grip so as to be easily moved therealong. Movement of the collar A is frictionally restricted so that any placement thereof is retained, and to this end the inner diameter 25 thereof can be depressed into the depressible grip G thereby holding its position. In practice and as shown, circumferentially spaced friction lugs 26 are provided at the inside diameter of collar A, said lugs depressing into the foamed rubber grip G in order to establish substantial frictional positioning engagement. It becomes a simple exercise to slide the anchor collar A into a desired or required position along the grip G, where it is temporarily held preparatory to locking for support engagement as next described.

A characteristic feature of this invention is the locked engagement of the anchor collar A on the grip G when support pressure is applied to the security strap S attached thereto. At one side of the ring-shaped collar A there is a radial bale 28 for the attachement of the security strap S. It is significant that the bale attachment for the strap is laterally displaced radially from the center axis of the anchor collar, so that downward pressure applied to the strap turns the collar from a normal transverse plane, causing it to depress into diametrically opposite sides of the grip as clearly shown in FIG. 5. That is, the bale 28 cantilevers from the ring shaped collar A, so that downward pressure on the bale causes the collar A to bear into opposite sides of the grip G where it bites into the soft rubber material thereof. A strengthening feature of the anchor collar A is a depending skirt 29 at the one side thereof beneath the bale, a semi-circular half skirt, that braces the cantilevered pull on the bale. This skirt 29 has an inner radius coincidental with the inner diameter 25 of the collar A, and it augments the "bite" capability of the turned ring as it is twisted into a locked condition as shown in FIGS. 5 and 6. That is, the lower semi-circular edge 30 of the skirt 29 digs more deeply than the ring per se diametrically opposite thereof, as clearly illustrated in FIG. 7. It is this bite that locks the anchor collar A for support pressure applied to the strap S.

The strap S is a flexible loop of belting material, for example a seven inch loop as shown, and it may be attached to the bale 28 in various ways. As shown, the strap S passes upwardly through a slot 31 and over a bar 32, and then downwardly through a slot 33 where its terminal ends are enlarged at 34. The two adjoining slots form the bar therebetween, whereby a bite of the strap over the bar sustains the application of pressure thereto as is indicated by the arrow a in FIG. 5. In practice, the strap is of a plastic material such as "Nylon", a trademark which is heat swaged as shown.

In accordance with this invention, I provide the multi purpose head means H fitted into and preferably over the top end portion of the pole body P, to close the same, and which has a screw fitting for adjustably securing a removable cap C thereon. The head H is comprised of a socket 35 fixed to the end portion of the handle portion 10 of pole P by a transverse pin or rivet 36, and of a peripheral flange 37 as large and preferably slightly larger in diameter than the grip G. A male screw fitting 38 projects axially from the top face 39 of the socket 35, and onto which the cap C is threadedly engaged.

The cap C is a disc-shaped member, preferably of the same diameter as the flange 39 of the sockethead H. In practice, the faces 39 and 40 are complementary so as to clamp together and onto the lines or tethers therebetween as will now be described. As shown, there is at least one and preferably a plurality of circumferentially spaced openings 41-44 through the flange 37, said openings 41-44 being disposed adjacent to the outside of the socket 35. In practice, a line or tether 11-14 is passed upwardly through the opening 41-44 and then adjusted radially outward through a continuing guide channel 41'-44', whereupon the cap C is screwed down so as to clamp the line or tether, in each instance, between the flange 37 and 40 face. Alternately, the cap C is loosened to release the line or tether, which is simply pulled free.

A feature of the head H and cap C is the friction lock means L comprised of interfering ribs 45 and 46 on the interfaces 39 and 40. The ribs 45 and 46 are concentric with the turning axis of the screw fitting 38, and at least one of which presents a cone-shaped surface, or the like, to wedgedly engage the other. In practice, the innermost rib 45 projects axially upward from the top face 39 of the socket-head H, and the outermost rib 46 projects axially downward from the bottom face 40 of the cap C. As shown, the outermost rib 46 is wedged and deflected outwardly by the innermost rib 45, with a comensurate frictional engagement as may be required in addition to compressive force applied onto the lines or tethers.

Among the multi-purposes of this hiking pole P, the cap C can be removed and stored upon a threaded peg 50 projecting from the anchor collar A, whereby the screw fitting 38 can be employed to mount a camera or like equipment, or to mount an implement such as an ax head or the like.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A multi purpose mountaineering pole adjustable to hiking conditions, and including;
   an elongated pole body with a lowermost ground engaging tip and an upper handle portion,
   a depressible elongated grip sleeve coextensively fixed onto the handle portion,
   a security strap attached to anchor collar means frictionally engaged over and slidable on the grip elongated sleeve and adapted to be turned and depressed into the grip sleeve for locked engagement therewith when downward pressure is applied to the security strap attached thereto,
   and head means terminating the uppermost end of the pole body.

2. The mountaineering pole as set forth in claim 1, wherein the security strap is a loop of flexible belting attached to one side of a collar of the anchor collar means.

3. The mountaineering pole as set forth in claim 1, wherein the security strap is attached to a bale cantilevered from one side of a collar of the anchor collar means.

4. The mountaineering pole as set forth in claim 1, wherein the depressible elongated grip sleeve has a cylindrical exterior, and wherein the anchor collar means is comprised of a ring-shaped collar rotatably slideable over the elongated grip sleeve.

5. The mountaineering pole as set forth in claim 1, wherein the anchor collar means is comprised of a collar slideable over the elongated grip sleeve and includes a skirt depending therefrom with a lowermost edge for augmented bite engagement into the grip.

6. The mountaineering pole as set forth in claim 1, wherein the depressible elongated grip sleeve has a cylindrical exterior, and wherein the anchor collar means is comprised of a ring-shaped collar rotatably slideable over the elongated grip sleeve and includes a skirt depending therefrom with a lowermost edge for augmented bite engagement into the cylindrical exterior of the elongated grip sleeve.

7. The mountaineering pole as set forth in claim 1, wherein the depressible elongated grip sleeve has a cylindrical exterior, and wherein the anchor collar means is comprised of a ring-shaped collar rotatably slideable over the elongated grip sleeve and includes a semi circular skirt depending therefrom with a lowermost edge for augmented bite engagement into the cylindrical exterior of the elongated grip sleeve.

8. The mountaineering pole as set forth in claim 1, wherein the anchor collar means is comprised of a collar slideable over the depressible elongated grip sleeve and includes at least one inwardly projecting lug to augment frictional positioning engagement of the collar with the elongated grip sleeve.

9. The mountaineering pole as set forth in claim 1, wherein the depressible elongated grip sleeve has a cylindrical exterior and wherein the anchor collar means is comprised of a collar rotatably slidable over the depressible elongated grip sleeve and includes circumferentially spaced inwardly projecting lugs to augment frictional positioning engagement of the collar with the elongated grip sleeve.

10. The mountaineering pole as set forth in claim 1, wherein the pole body is tubular and the ground engaging tip and head means have sealed engagement therewith for floatation of the pole.

11. The mountaineering pole as set forth in claim 1, wherein the head means is comprised of a socket fixed to the upper end of the pole body, and a cap removably secured thereto by a screw fitting, whereby the screw fitting is exposed for accessory attachment.

12. The mountaineering pole as set forth in claim 1, wherein the head means is comprised of a socket fixed to the upper end of the pole body and with a flange having at least one opening to pass a line over the flange, and a cap removably secure to the socket by a screw fitting with the line clamped therebetween.

13. The mountaineering pole as set forth in claim 1, wherein the head means is comprised of a socket fixed to the upper end of the pole body and with a top face and flange having at least one opening to pass a line over the top face and flange, and a cap removably secured to the socket by a screw fitting and having a bottom face clamping the line to the top face and flange of the socket.

14. The mountaineering pole as set forth in claim 11, wherein the socket and cap include frictional lock means comprised of interfering ribs projecting radially from opposed faces thereof.

15. The mountaineering pole as set forth in claim 13, wherein the socket and cap include frictional lock means comprised of interfering concentric ribs, there being a circular rib projecting from the top face of the socket and engageable with a circular rib projecting from the bottom face of the cap.

16. The mountaineering pole as set forth in claim 15, wherein one of the ribs has a conical surface engaged by the other rib.

17. The mountaineering pole as set forth in claim 1, wherein the depressible elongated grip sleeve is of rubber and the like material having a softness for depression of the anchor collar therein.

18. The mountaineering pole as set forth in claim 1, wherein the depressible elongated grip sleeve is of rubber and the like material having a Shore hardness of 55 to 70 for depression of the anchor collar therein.

19. The mountaineering pole as set forth in claim 1, wherein the depressible elongated grip sleeve has a cylindrical exterior and wherein the anchor collar means is comprised of a collar rotatably slideable over the depressible elongated grip sleeve and includes circumferentially spaced inwardly projecting lugs to augment frictional positioning engagement of the collar with the elongated grip sleeve, and wherein the head means is comprised of a socket fixed to the upper end of the pole body and with a top face and flange having at least one opening to pass a line over the top face and flange, and a cap removably secured to the socket by a screw fitting and having a bottom face clamping the line to the top face and flange of the socket.

* * * * *